(12) United States Patent
Klosa et al.

(10) Patent No.: US 11,062,194 B2
(45) Date of Patent: Jul. 13, 2021

(54) RF FRONTEND INTERFACE FOR A 61 GHZ RADIO POWERED COMMUNICATION TAG DEVICE

(71) Applicant: RACYICS GMBH, Dresden (DE)

(72) Inventors: Thomas Klosa, Dresden (DE); Sebastian Höppner, Dresden (DE)

(73) Assignee: RACYICS GMBH, Dresden (DE)

( * ) Notice: Subject to any disclaimer, the term of this patent is extended or adjusted under 35 U.S.C. 154(b) by 0 days.

(21) Appl. No.: 16/793,437

(22) Filed: Feb. 18, 2020

(65) Prior Publication Data

US 2020/0265287 A1    Aug. 20, 2020

(30) Foreign Application Priority Data

Feb. 18, 2019  (EP) .................................... 19157650

(51) Int. Cl.
*G06K 19/02* (2006.01)
*G06K 19/077* (2006.01)
*H01Q 1/24* (2006.01)
*H01Q 13/18* (2006.01)

(52) U.S. Cl.
CPC ... *G06K 19/07773* (2013.01); *G06K 19/0772* (2013.01); *G06K 19/07749* (2013.01); *H01Q 1/248* (2013.01); *H01Q 13/18* (2013.01)

(58) Field of Classification Search
CPC .. H02J 50/90; H02J 50/80; H02J 7/025; H02J 50/12; A61N 1/3787
USPC ........................................ 235/387, 388, 492
See application file for complete search history.

(56) References Cited

U.S. PATENT DOCUMENTS

| 6,480,699 | B1* | 11/2002 | Lovoi | G06K 19/0701 455/41.2 |
| 7,167,077 | B2* | 1/2007 | Grassl | G06K 19/073 235/380 |
| 7,167,090 | B1* | 1/2007 | Mandal | H01Q 1/2225 340/538.14 |
| 2013/0299593 | A1* | 11/2013 | Glidden, III | G06K 19/0723 235/492 |
| 2014/0284386 | A1* | 9/2014 | Finn | H01Q 7/06 235/488 |
| 2015/0097037 | A1* | 4/2015 | Narendra | G06K 19/07701 235/488 |
| 2018/0309188 | A1* | 10/2018 | Jeon | H01Q 1/42 |

* cited by examiner

*Primary Examiner* — Daniel St Cyr
(74) *Attorney, Agent, or Firm* — Heslin Rothenberg Farley and Mesiti PC; Nicholas Mesiti

(57) ABSTRACT

A RF frontend interface for a 61 GHz radio powered communication tag device with a built-in antenna includes an IC embedded in a silicon die with a top metallization layer and a dielectric resonant body linked to the silicon die. A high impedance antenna with two feed points is embedded into the top metallization layer and a RF rectifier and multiplier circuit connected to the antenna feed is integrated in the silicon die and symmetrically placed between the antenna feed points configured to stabilize the antenna resonant frequency with its inherent capacity against varying surrounding materials and generate a positive and negative DC output supply voltage against a bulk potential of the silicon die for directly operating a digital circuit in FDSOI technology embedded in the silicon die. The resonant body is configured to work as a wavelength translator in between the antenna and free space.

17 Claims, 11 Drawing Sheets

Figure 1:
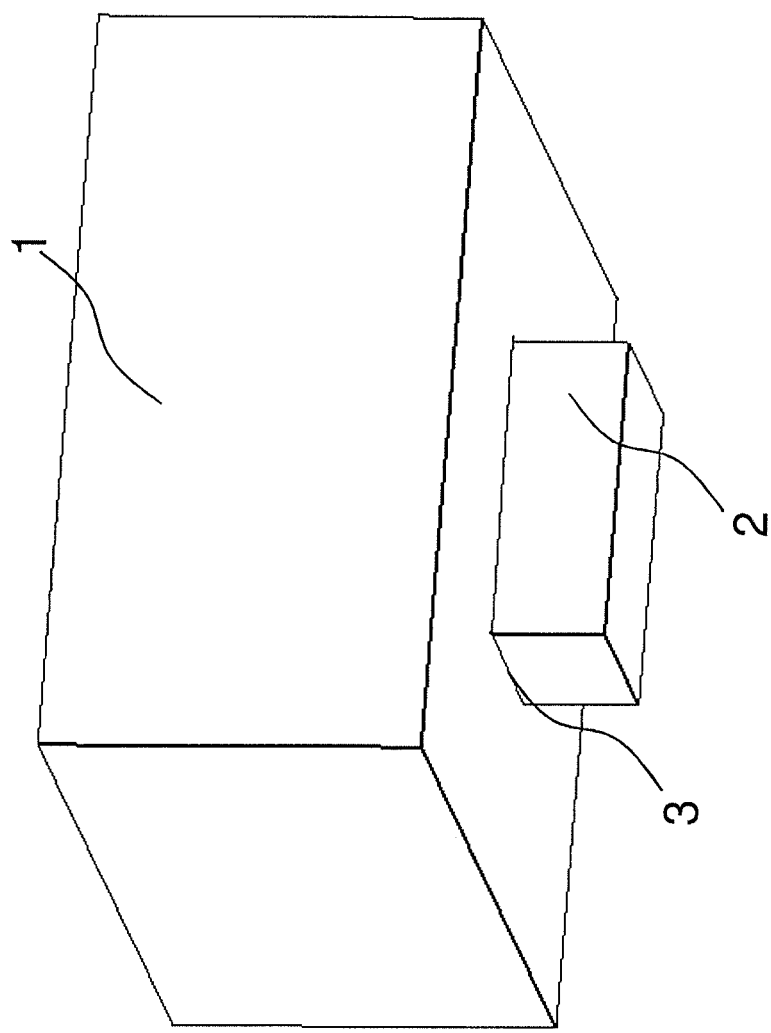

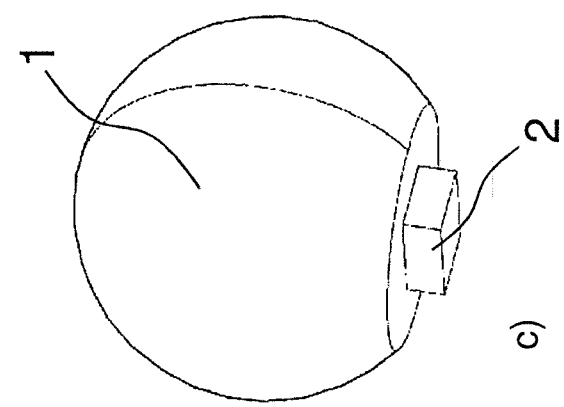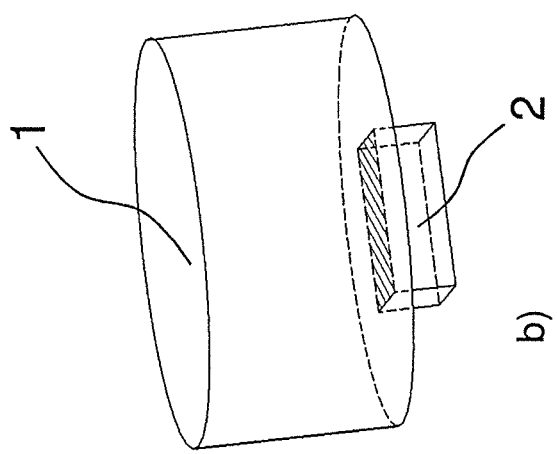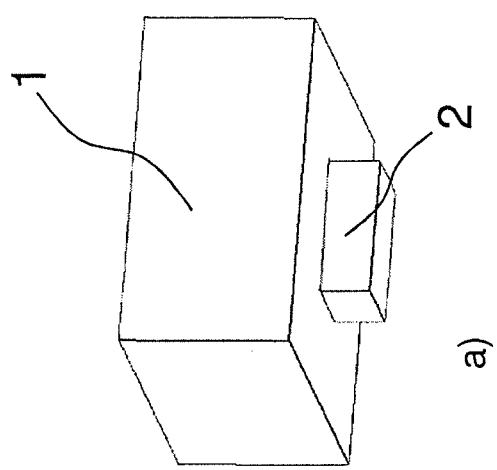
Fig. 2

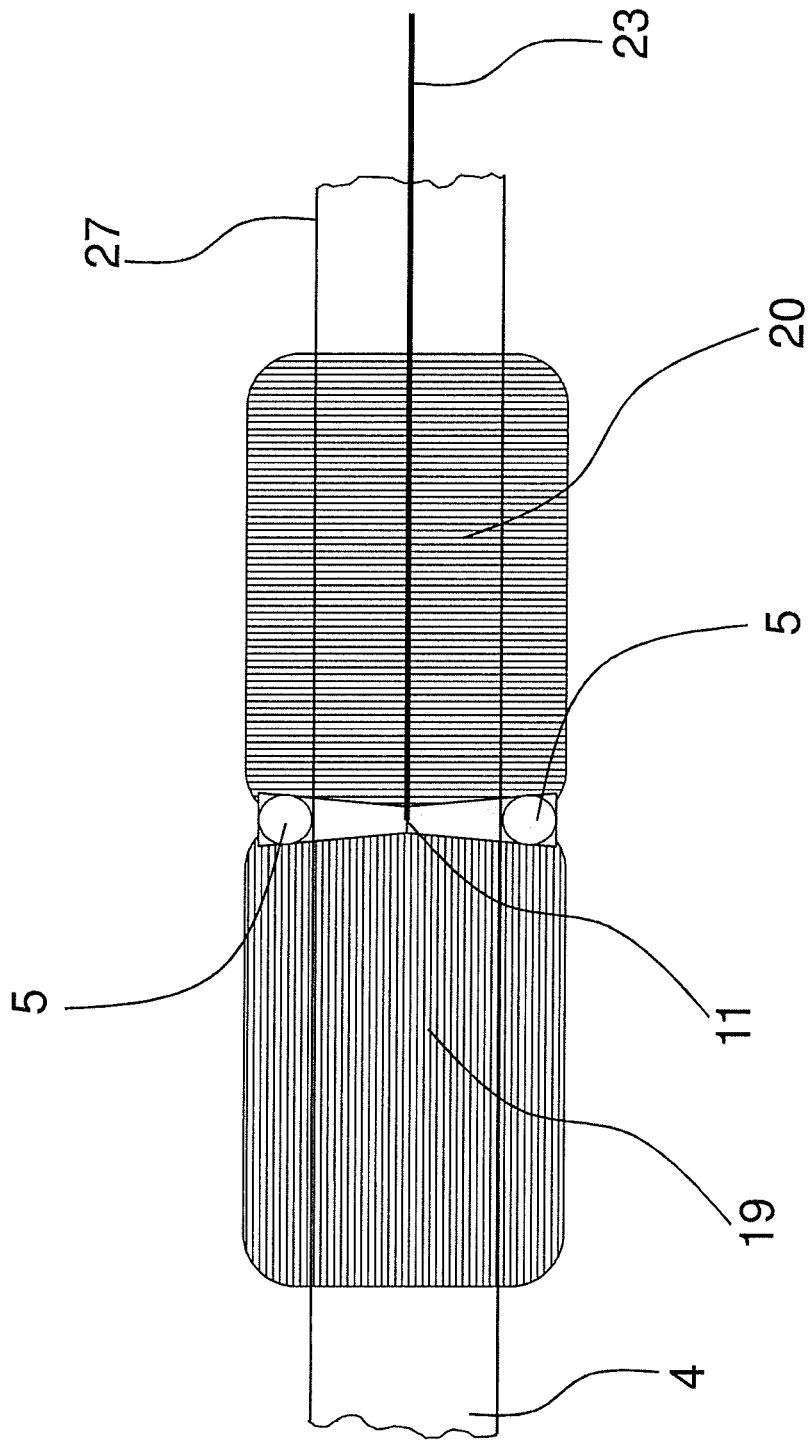

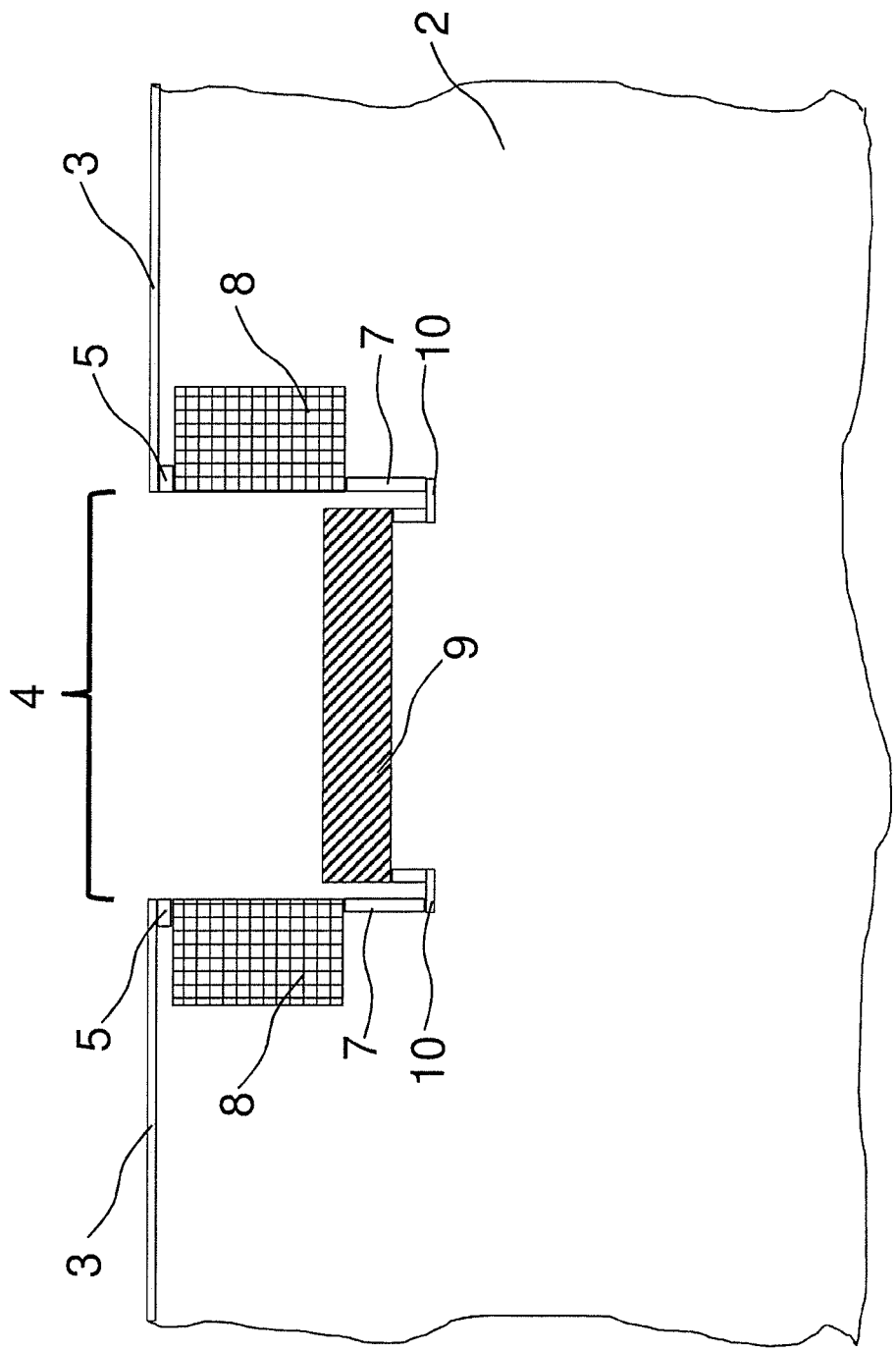

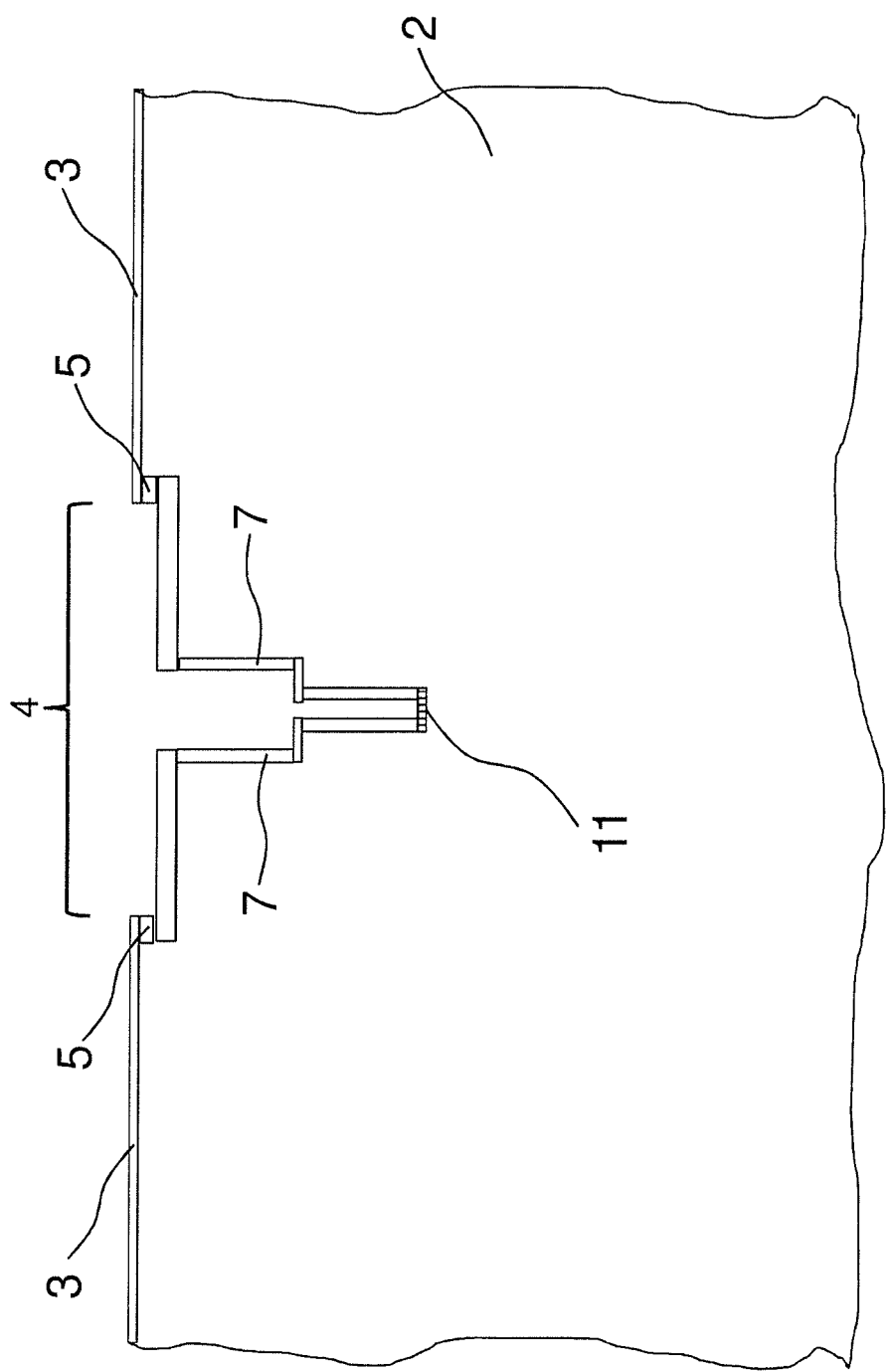

RF FRONTEND INTERFACE FOR A 61 GHZ RADIO POWERED COMMUNICATION TAG DEVICE

CROSS REFERENCE TO RELATED APPLICATIONS

This application is a U.S. Patent Application filing which claims priority to European Application No.: EP19157650.3, filed on Feb. 18, 2019, which is hereby incorporated by reference herein in its entirety.

The invention relates to a radio frequency (RF) frontend interface for a 61 GHz radio powered communication tag device.

BACKGROUND

Advancing steps for existing RFID and NFC technologies are the reduction of size and costs as well as to overcome mounting limitations on conductive materials. On chip antenna integration is a logical step. For given integrated circuit die sizes this leads to millimeter wave frequencies with focus to the license free ISM (Industrial, Scientific and Medical) band at 61 GHz.

The antenna integration on standard advanced node semiconductor technologies will face the following challenges: dealing with the resistive loss in typical low resistive integrated circuit (IC) bulk material; the need of short antenna geometries due to high permittivity of the bulk material in addition to a capacitive load from the rectifier; reactive components with high quality factor are not available on chip; generating a voltage of greater than 0.4V DC from single hundred millivolts RF at the antenna and a robust design with low tuning sensitivity against different mounting environments for the tag.

Existing RFID and NFC solutions do not use on-chip antennas. The die is mounted on an antenna carrier instead to meet the size requirements for an UHF (ultra high frequency) band antenna.

The use of a resonator or a dielectric substrate layer on top of the silicon to improve antennas on conductive material has been described in literature yet.

In most cases the existing energy harvesting systems use dipole or loop antennas with matching circuits. Due to the resistance in narrow gauge on chip metal and conductive bulk material the standard silicon technologies do not provide high Q circuit elements. Therefore, it is impossible to implement low loss antenna matching circuits for larger impedance differences in an integrated circuit (IC) design.

Current UHF RFID and NFC communication solutions cannot be down sized to the level of an integrated circuit. Consequently there are limits for cost and size reduction.

Depending on the RFID variant, there are strong mounting limitations on conductive and ferromagnetic materials like steel and other metals.

So, the objective of the present invention can be seen therein to create a good trade-off for the following conflicting goals: it should be possible to use a standard volume production silicon process with conductive bulk material and create a well performing antenna. Furthermore, a mechanically stable and environmentally passive tag device should be created by adding a minimum of parts and materials. A built-in antenna should be created that is not tuned away in varying application mount environments. And operating voltages for a digital system should be generated from a much lower RF input voltage with a minimum of multiplier stages.

SUMMARY OF THE INVENTION

The objective will be solved by a radio frequency frontend interface for a 61 GHz radio powered communication tag device comprising an integrated circuit (IC) embedded in a silicon die with a top metallization layer and a dielectric resonant body linked to the silicon die, whereas a high impedance antenna with two antenna feed points is embedded into the top metallization layer of the silicon die and a RF rectifier and multiplier circuit as part of the IC and connected to the antenna feed is integrated in the silicon die and symmetrically placed between the antenna feed points configured to stabilize the antenna resonant frequency with its inherent capacity against varying surrounding materials and to generate a positive and negative DC output supply voltage against a bulk potential of the silicon die for directly operating a digital circuit in FDSOI technology embedded in the silicon die and whereas the resonant body is configured to work as a wavelength translator in between the antenna and free space.

A radio frequency frontend interface according to the present invention is understood as the interface between the free space electromagnetic wave and the circuitry which processes the signal at a digital protocol level. The integrated antenna is part of the interface as well as the resonant body which is necessary for the implementation of the antenna function, and does also serve as a mechanical carrier.

The efficiency of an RF rectifier will increase with the input voltage (+RF feed/−RF feed) since all kinds of rectifier devices suffer from a build in voltage barrier. The ratio of voltage versus current at the antenna feed is determined by the antenna feed impedance. In the absence of high Q reactive elements, the antenna impedance must be chosen as high as possible to generate a high voltage for the rectifier input. For that reason, in a preferred embodiment and as a preferred example a not folded rectangular slot antenna can be implemented. In such a construction the rectifier and multiplier circuit is placed right in between the antenna feed points in order to avoid lossy transmission lines in between antenna and rectifier.

The inventive RF front-end interface is designed such that the rectifier and multiplier circuitry is designed for energy harvesting of a tag device connected to the antenna providing the desired power. At the same time, an antenna type is selected, wherein the dimension of the antenna is adapted to the rectifier circuit. According to the selection of the antenna type the shape, size and material of the resonant body is determined to find an optimum performance between rectifier circuit, antenna type and resonant body. It is important that the characteristics of the rectifier circuit and of the antenna match to each other therein that the rectifier circuit resonates with the antenna and to generate a symmetrical supply voltage for the communication tag device.

The input impedance of such a rectifier circuit has a relatively high capacitive portion. Due to the proximity of antenna and rectifier, this excess capacitance can be matched with shorter antenna geometry. This has further the advantage that the antenna resonant frequency is more determined by the rectifier load and by geometry than the surrounding materials. So, this minimizes the sensitivity of the described setup against changes in surrounding materials. Although, such a short antenna by itself would have a low performance if radiating against free space but the resonant body on top of this setup will do the required wavelength translation.

In FDSOI (Fully Depleted Silicon On Insulator) technologies a digital circuit can directly be operated from a DC (direct current) voltage symmetric to the bulk potential.

In a variant of the inventive radio frequency frontend interface, the rectifier circuit is used for energy harvesting connected to the antenna, whereas the rectifier circuit is placed symmetric to the antenna to resonate with the antenna. The rectifier circuit always comprises RF capacitors, DC capacitors and rectifier transistors, which are symmetrically placed to the antenna. Due to the proximity of the antenna and rectifier lossy transmission lines in between the antenna and the rectifier can be avoided. A typical rectifier design has always a capacitive matching impedance. This excess capacitance can be matched with a shorter antenna geometry and hence reduces the size of the setup. The rectifier capacity stabilizes the antenna resonant frequency against varying surrounding materials due to its dominating influence.

Furthermore, in another variant of the inventive radio frequency frontend, the rectifier circuit is complimented with a backscatter modulation transistor. This transistor is connected in parallel with the rectifier input at the antenna feed terminals or points. It can be used for backscatter modulation. This variant would be capable of energy harvesting and backscatter modulation.

In another further variant of the inventive radio frequency frontend interface, there is only a backscatter modulation transistor connected to the antenna. This variant would be capable of backscatter modulation for the case that there is another energy source available. There is no rectifier circuit in this variant.

In a variant of the inventive RF frontend interface, if the antenna is designed as a single ended antenna feed, two rectifier and multiplier circuits with single ended inputs generate the positive and negative DC output supply voltage. This variant can also be completed with a single ended backscatter modulation transistor.

The antenna integrated in the top metallization layer on the silicon die can be configured as a differential also called symmetric antenna or as a single ended antenna. In both cases, the antenna comprises two antenna feed points. One antenna feed point is always connected to the antenna; whereas the second antenna feed point is also connected to the antenna in case of a differential antenna. Whereas the second antenna feed point is connected to the bulk substrate of the silicon die hence is defined as ground potential in case of a single ended antenna. Depending on the antenna the rectifier circuit is formed single or double symmetric. A single or double symmetric rectifier circuit has always a symmetric output, whereas a double symmetric rectifier circuit has also a symmetric capacitive input.

Per default an antenna submits a voltage swing that is symmetric against the bulk silicon potential (silicon die) at its feed points. This allows the operation with two symmetric rectifier and multiplier circuits with a positive (V+) and a negative (V−) DC output against the bulk potential. In such a setup each rectifier generates only half of the required operating voltage and is therefore more efficient. In the variant of a single ended antenna feed it is also possible to operate two rectifiers with single ended inputs to generate the positive and negative DC output supply voltage of the rectifier. The single and double symmetric rectifier generates symmetrical positive (V+) and negative (V−) output voltage, which are small but are generated with good efficiency, but whose difference is still high enough to control and drive a subsequent logic.

In another preferred variant of the inventive RF frontend interface, the antenna is an unfolded rectangular slot antenna, whereas the rectifier circuit is arranged symmetrically along a longitudinal extend of the slot of the slot antenna. The slot of a slot antenna has a length and a width, whereas the length is longer than the width. The longitudinal extend of the slot is understood along the length of the slot of the slot antenna. In this context, a centerline of the slot is understood as the line in the center of the slot along the longitudinal extension of the slot.

The rectifier has been constructed with the RF capacitors implemented in higher metal layers right underneath the antenna layer to minimize resistive loss and let parasitic capacitors mainly build up in parallel with existing circuit capacitors. The antenna layer is understood as the top metal layer in which the antenna, for example a rectangular slot antenna is built into. The rectifiers DC capacitors are placed symmetric on deeper layers of the silicon die as the RF capacitors and inside the slot of the antenna. This has the advantage that coupling with the RF metal structures is reduced. Rectifier transistors are placed in between both capacitor types.

For all variants of the inventive RF frontend interface with a backscatter modulation transistor and a slot antenna, the modulation gate terminal of the backscatter modulation transistor is routed along the centerline of the slot of the antenna to be orthogonal and therefore unaffected by the electric field of the slot antenna. A charge pump circuit is configured to drive or control a required gate voltage for the backscatter modulation transistor from the supply voltage of the rectifier circuit, where a RFID data signal is used as a switching clock.

In a preferred variant of the inventive RF frontend interface, the FDSOI digital circuit which can be integrated into the silicon die and is considered as subsequent logic, comprises a VNW (n-well voltage) and VPW (p-well voltage) connection and a well capacity which can be used as an additional energy storage capacitor. So, the supply voltages (V+, V−, bulk) generated and provided by the rectifier circuit out of the RF field can be used as back bias sources (VNW, VPW, GND) of the FDSOI substrate. Depending on the application, there are three voltage levels available for biasing. The negative supply (V−), the bulk level for zero bias and the positive supply (V+) level can be used for back biasing depending on the application needs. It is possible to connect the positive supply voltage, negative supply voltage and ground level of the silicon die to the VNW and VPW connection of the FDSOI digital circuit in order to operate in forward or reverse or zero body bias conditions. For energy harvesting applications, the well capacity can in addition work as an energy storage capacitor.

In a variant of the inventive RF frontend interface, the resonant body consists of a dielectric material with a dielectric constant of 5 or higher. As already described the resonant body or dielectric resonator is mounted on top of the integrated circuit, in order to support the antenna performance against the conductive bulk material. The dielectric resonator material has been chosen with a dielectric constant of 5 or higher. Since most of the plastic material in daily life have dielectric constants smaller than 4, the bodies resonance and radiation properties are barely affected when the tag is mounted in most of the daily life materials.

At the same time, only the dielectric resonator must meet the size requirements for free space radiation and can be made of much cheaper material than the integrated circuit. This will allow further reducing the required silicon die size and therefore the costs.

In another variant of the inventive RF frontend interface, the material of the resonant body is ceramic or glass or high resistive silicon. All these materials are or can be made insensitive against environmental influences.

In a further variant of the inventive RF frontend interface, the resonant body has a cuboidal or a cylindrical or a spherical shape. A tag using a cuboidal or cube shaped resonator can be manufactured with existing technologies. The known good dies get assembled on an aluminum ceramic sheet as available in the market. Existing saw cut technology is used to separate the individual tags afterwards. But also other forms or shapes are possible for the resonant body. The invention is not limited on the presented and named forms.

In a preferred variant, the RF frontend interface is used in RFID communication application or in near field communication (NFC) application.

The core of the inventive RF frontend interface for a 61 GHz radio powered communication tag device is the combination of a resonant body on top of a high impedance unfolded antenna with a capacitive double or single symmetric rectifier and further with a FDSOI semiconductor technology.

This structure combination is supposed to provide the maximum performance at lowest cost and minimum silicon size for millimeter wave energy harvesting and communication systems as used in applications like RFID or near field communication.

The invention will be explained in more detail using exemplary embodiments.

BRIEF DESCRIPTION OF THE DRAWING FIGURES

Figure 3A:
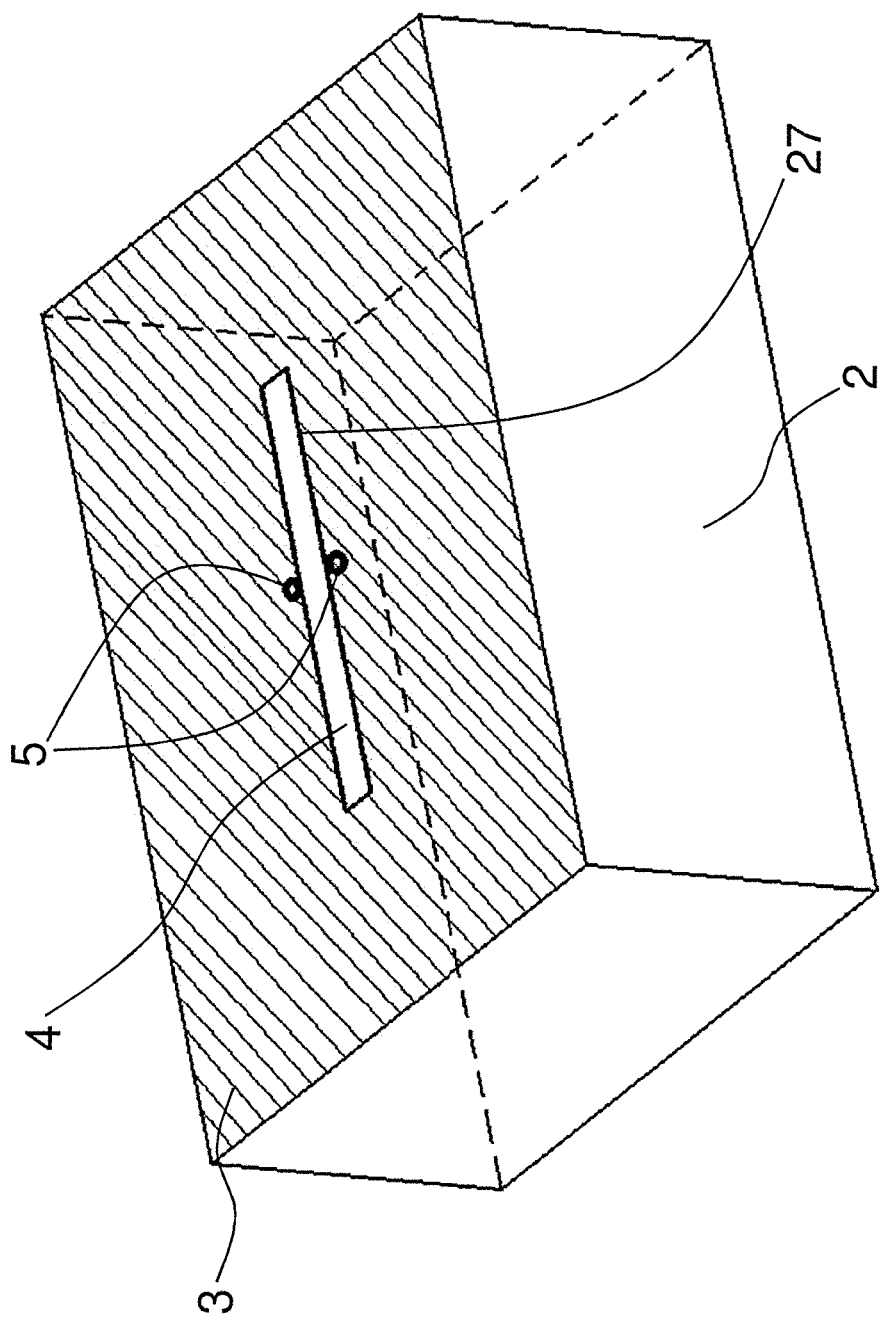
Figure 3B:
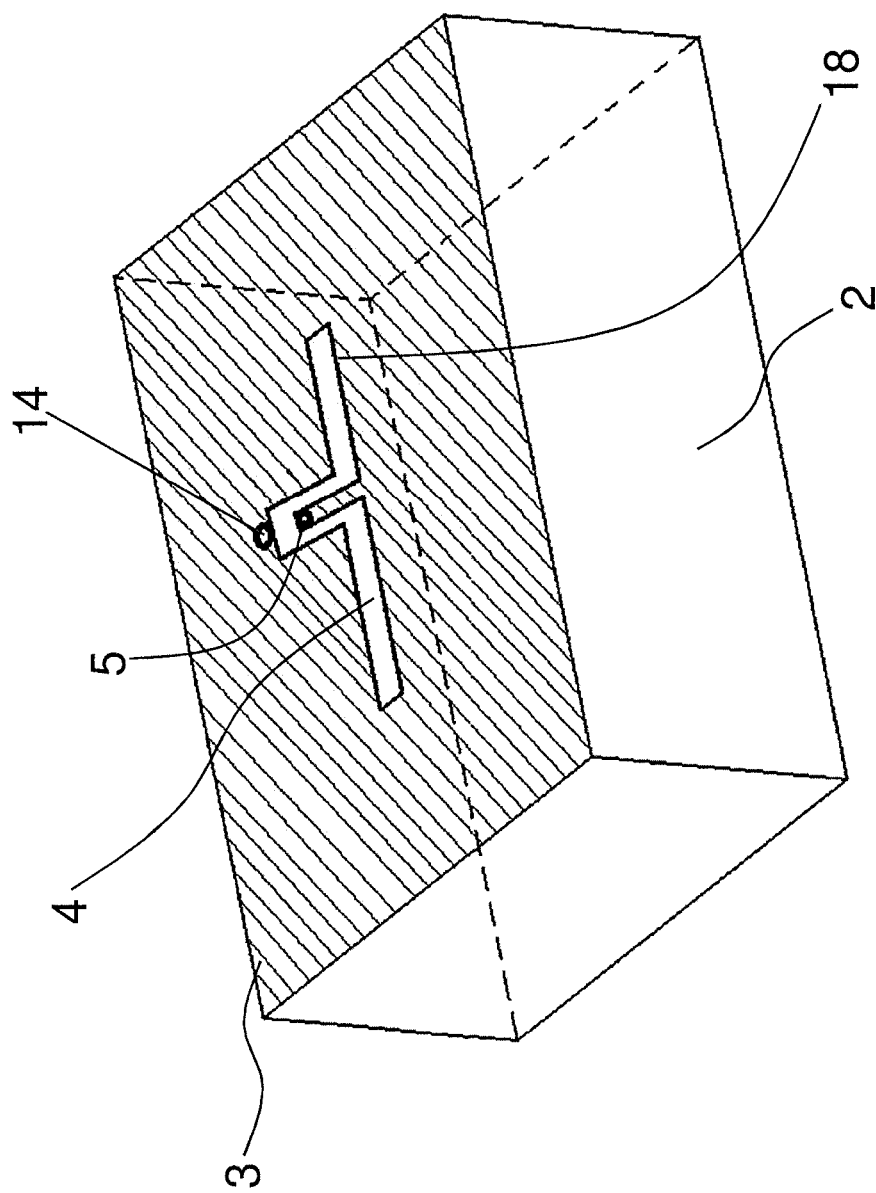
Figure 4:
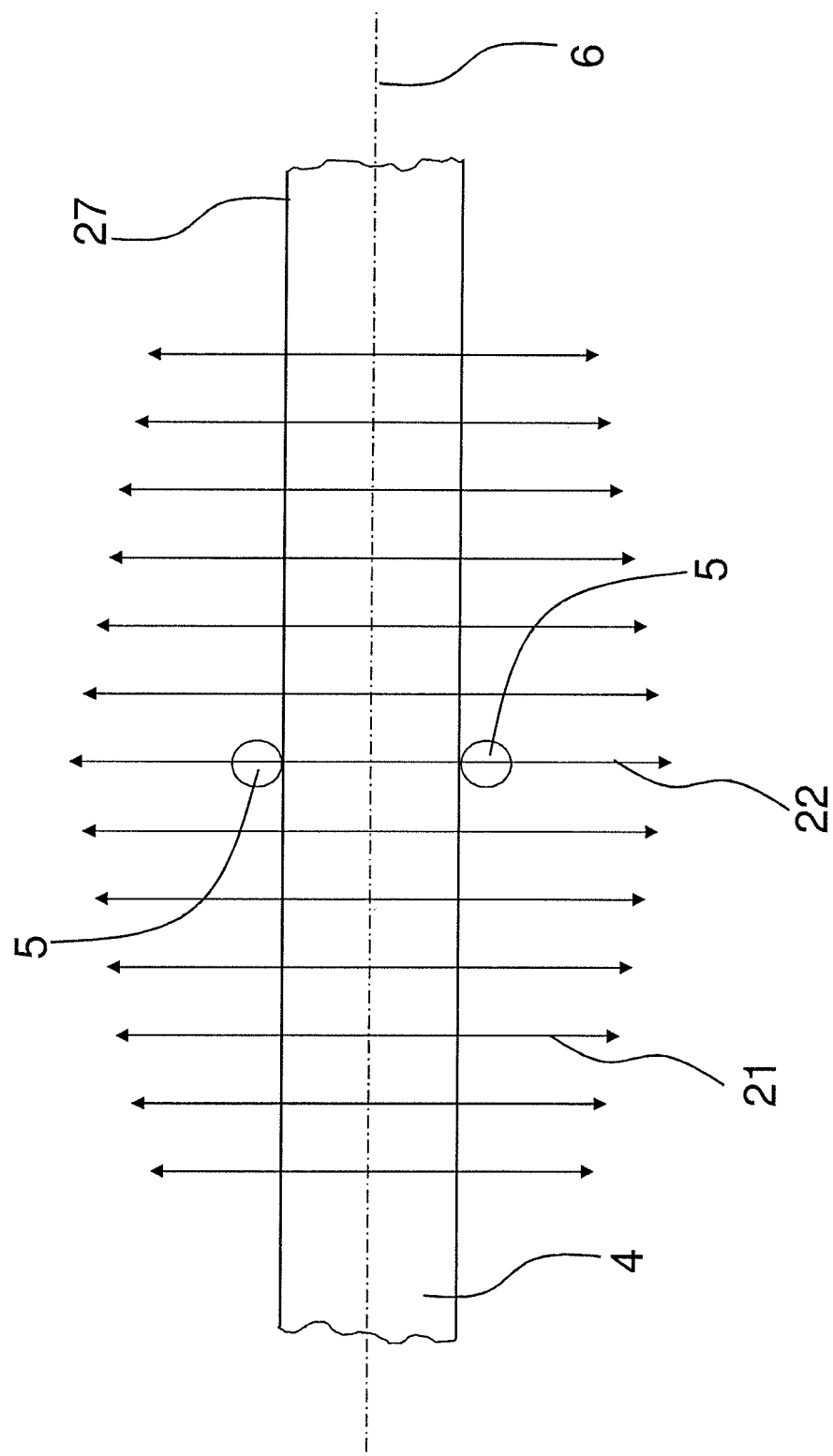
Figure 5B:
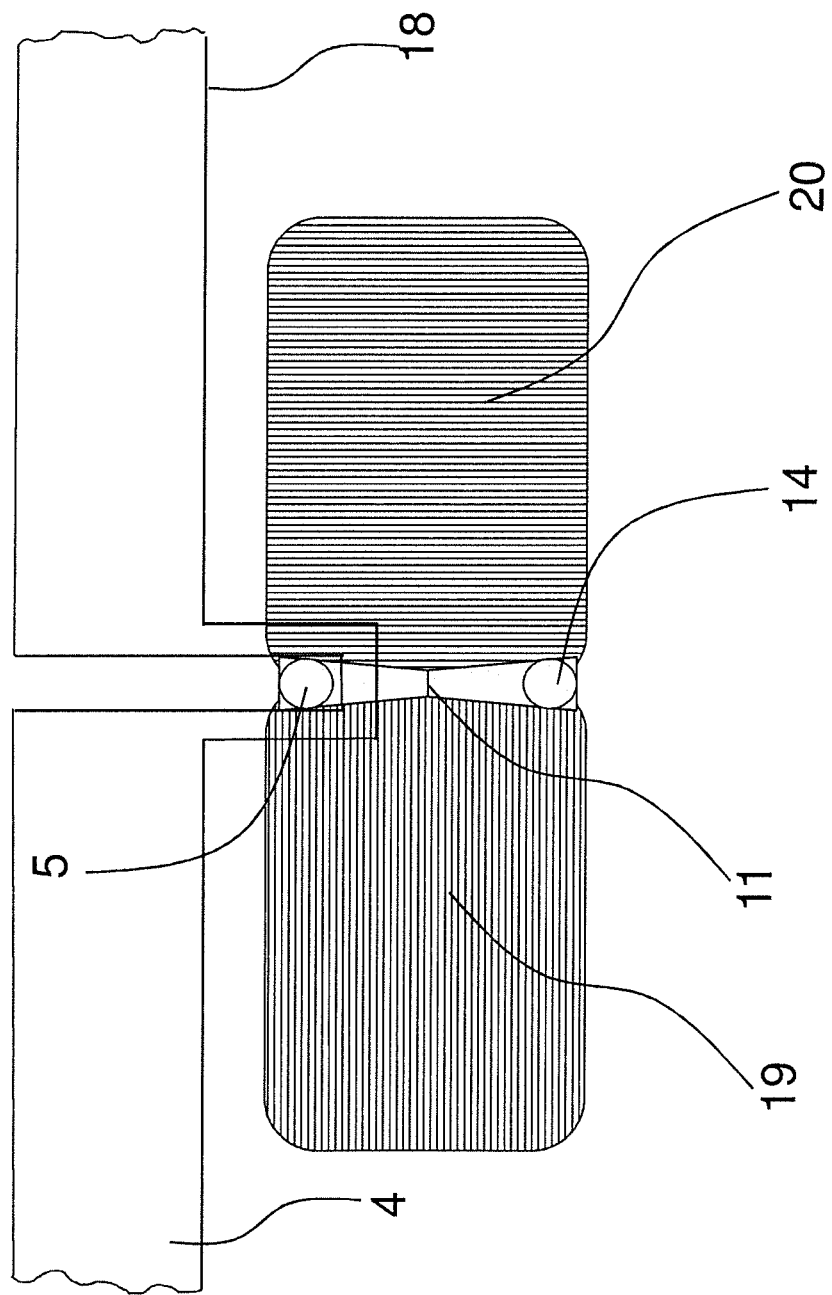
Figure 8A:
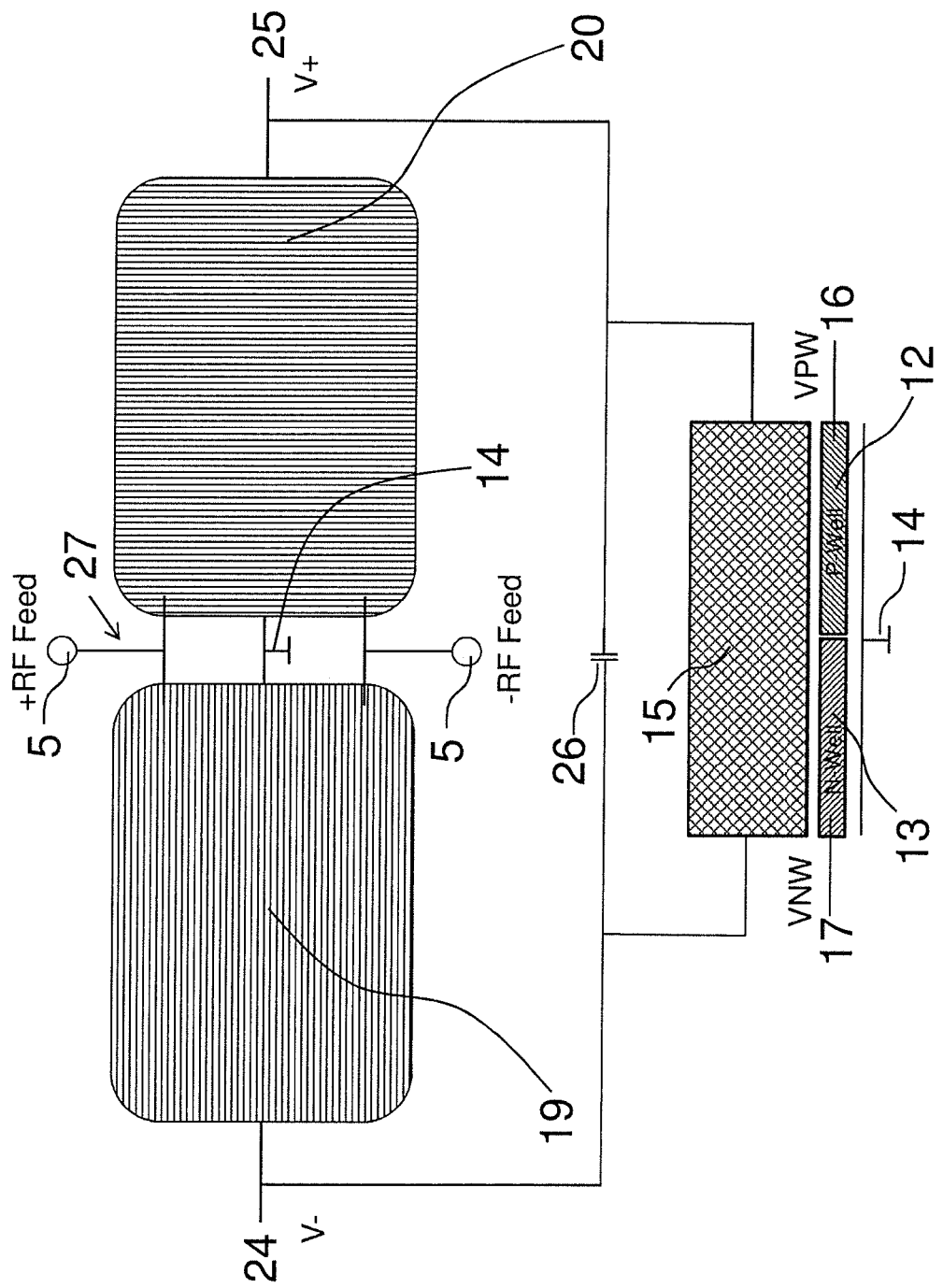

The appended drawings show
FIG. 1 Resonator and silicon die mounting;
FIG. 2 Resonator variants;
FIG. 3a Silicon die with differential antenna;
FIG. 3b Silicon die with single ended antenna;
FIG. 4 Slot antenna electric field (top view);
FIG. 5a Antenna feed differential, Rectifier and Backscatter Transistor (top view);
FIG. 5b Antenna feed single ended, Rectifier and Backscatter Transistor (top view);
FIG. 6 Antenna feed to rectifier (cross section);
FIG. 7 Antenna feed to modulation transistor (cross section);
FIG. 8a Principle of symmetric logic supply voltage for a differential antenna; and
FIG. 8b Principle of symmetric logic supply voltage for a single ended antenna.

DETAILED DESCRIPTION

In a preferred embodiment of the inventive RF frontend interface for a 61 GHz radio powered communication tag device the resonant body 1 or dielectric resonator as shown schematically in FIG. 1 is mounted on top of a silicon die 2 to support the antenna performance against the conductive bulk material and to serve as a mechanical carrier. The dielectric resonator material has been chosen with a dielectric constant of 5 or higher. Since most of the plastic material in daily life have dielectric constants smaller than 4, the bodies resonance and radiation properties are barely affected when the tag is mounted in most of the daily life materials. At the same time, only the dielectric resonator 1 must meet the size requirements for free space radiation and can be made of much cheaper material than the integrated circuit. This will allow further reducing the required silicon die 2 size and therefore the costs.

FIG. 2 shows different resonator body 1 shape variants. As typical examples the resonant body 1 can have a cuboidal or a cylindrical or a spherical shape or form. A cuboidal resonator (FIG. 2a) has the advantage that it can be manufactured using existing technology. Silicon dies could be assembled in a 2D grid on a large ceramic substrate plate. In a second step this plate is saw cut into individual tag devices. A cylindrical resonator (FIG. 2b) has the advantage that it can be saw cut from rod shaped base material. A spherical resonator (FIG. 2c) has the advantage that there are high volume technologies to manufacture large numbers of balls with very low tolerances.

FIG. 3a shows a schematic view of the silicon die 2 with a rectangular unfolded slot differential antenna and its feed points 5 in a preferred embodiment. The side or surface of the silicon die 2 with the antenna and the resonant body 1 is also called the air interface side, and the opposite side with the silicon die is called the antenna feed end side. The silicon die 2 comprises a top metallization layer 3 in which the differential slot antenna 27 with central antenna feed points 5 lies in. An unfolded rectangular slot 4 antenna 27 has been implemented in order to obtain an antenna impedance as high as possible to generate a high voltage for the rectifier input. FIG. 3b shows a further embodiment of the silicon die 2 with a rectangular unfolded slot single ended antenna 18, whereas one antenna feed contact 5 is connected to the antenna and the second antenna feed contact 14 is connected to ground potential. The antenna 18 is symmetric to the antenna feed points 5, 14.

FIG. 4 shows the electric field 21 of the slot antenna 18, 27 in top view. The electric field reaches its maximum 22 in the center of the slot 4, i.e. transversely to the longitudinal extension of the slot 4, whereas the electric field is zero along the centerline 6, i.e. along the longitudinal extension of the slot 4. The ratio of voltage vs. current at the antenna feed is determined by the antenna feed impedance. In an embodiment of the inventive RF frontend interface the modulation gate connection is routed on the slot 4 centerline 6 to be orthogonal to the electric field 21 and therefore unaffected. A charge pump circuit (not shown) generates the required gate voltage from the symmetric supply using the RFID data signal as a switching clock.

FIGS. 5 to 7 show the relative position of the antenna feed 5, 14 to the rectifiers 19, 20 and to the backscatter modulation transistor 11. In an embodiment, the rectifiers 19, 20 can be placed symmetric in line right in between the antenna feed points 5 avoiding lossy transmission lines in between the differential antenna 27 and rectifier 19, 20 (FIG. 5a).

FIG. 5b shows a further embodiment, where a single ended antenna 18 is symmetrically arranged to the antenna feed point 5 which is connected to the antenna. The rectifier and modulation circuits 19 and 20 are placed symmetric in line right in between the antenna feed points 5 and 14. The second antenna feed point 14 is on ground potential and the rectifier circuits 19, 20 are configured with a single ended input respectively.

RF capacitors are placed right underneath the antenna metal layer 3 where connection 7 exists already. The DC capacitors 9 use an area on deeper layers than the RF capacitors 8 inside the slot 4 for reduced coupling with the RF metal structures (FIG. 6) and hence provide a robust design with a low tuning sensitivity against different mounting environments for the tag. The RF capacitors 8 of the rectifier circuits 19, 20 are placed symmetric right underneath the antenna layer 3 and connected to the antennas feed contacts 5. This excess capacitance can be matched with shorter antenna geometry and hence reduces the size of the setup. The modulation transistor 11 has been placed right in the center of the slot 4 with its gate control wire 23 in line with the slot 4 (FIG. 7). The individual circuit elements are structured to place the parts in a way where parasitic currents are mainly in line with practically used currents to gain efficiency.

Figure 8B:
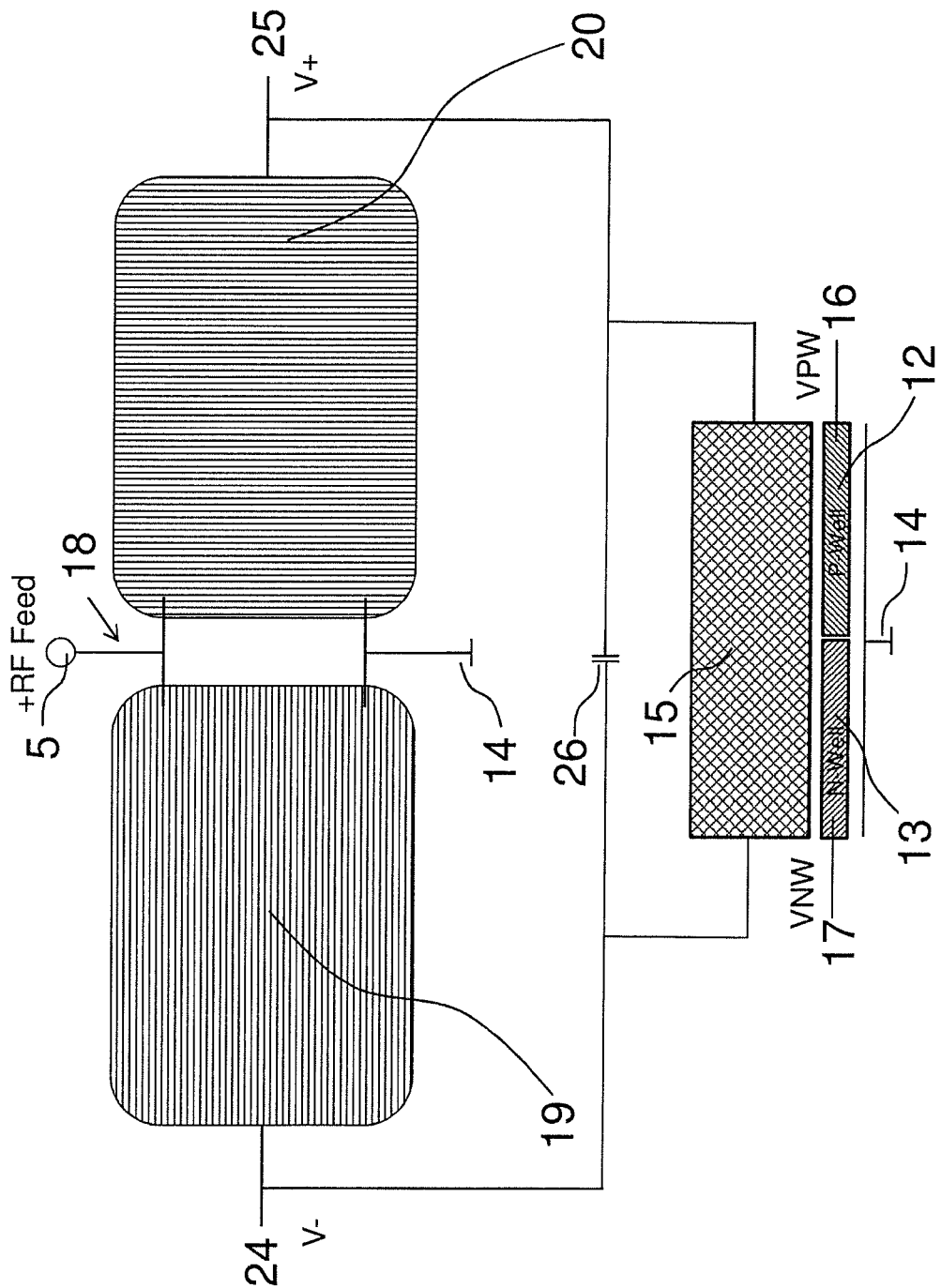

FIGS. 8a and 8b show the principle of symmetric logic supply voltage. The efficiency of an RF rectifier will increase with the input voltage (+RF feed/−RF feed) since all kinds of rectifier devices suffer from a build in voltage barrier. Per default a slot antenna submits a voltage swing that is symmetric against the bulk silicon potential (silicon die) at its feed points. This allows the operation with two symmetric rectifiers 19, 20 and multiplier circuits with a positive 20 (V+) and a negative 19 (V−) DC output against the bulk potential 14. In such a setup each rectifier 19, 20 generates only half of the required operating voltage and is therefore more efficient. In case of a single ended antenna feed 18 (FIG. 8b) it is also possible to operate two rectifiers 19, 20 with single ended inputs to generate the positive 25 and negative supply voltage output 24. In FDSOI technologies a digital circuit 15 can directly be operated from such a DC voltage 24, 25 symmetric to the bulk potential 14 as shown in FIGS. 8a and 8b. The well capacity can be used as an additional energy storage capacitor 26.

In an embodiment of the inventive RF frontend interface the ground level 14 as well as positive 20 (V+) and negative 19 (V−) supply are connected as back biasing sources with various options: Connection of V+25, GND 14, V− 24 to VNW 17 and VPW 16 realize combinations to allow the circuit to operate in forward or reverse body bias conditions. Forward biasing (V+ 25 connected to VNW 17, V− 24 connected to VPW 16) has the advantage of reduced threshold voltage of the logic transistors to enable logic operation at low supply voltages ((v+)-(v−)).

LIST OF REFERENCE SIGNS

1 Resonant body
2 Silicon die
3 Top metallisation layer
4 Antenna slot
5 Antenna feed points/antenna feed contacts
6 Centerline of the slot antenna
7 Metal connections
8 RF capacitor
9 DC capacitor
10 Rectifier transistor
11 Backscatter modulation transistor
12 P-well region
13 N-well region
14 Ground potential bulk substrate
15 FDSOI logic circuit
16 VPW −p-well voltage
17 VNW −n-well voltage
18 single ended antenna
19 Negative voltage rectifier
20 Positive voltage rectifier
21 Electric field vectors
22 Maximum electric field
23 Modulation transistor gate routing on slot center line
24 Negative supply voltage output
25 Positive supply voltage output
26 Energy storage capacitor
27 Differential/symmetric antenna

The invention claimed is:

1. A radio frequency frontend interface for a 61 GHz radio powered communication tag device comprising an integrated circuit (IC) embedded in a silicon die with a top metallization layer and a dielectric resonant body linked to the silicon die, wherein a high impedance antenna with two antenna feed points is embedded into the top metallization layer of the silicon die and a RF rectifier and multiplier circuit as part of the IC and connected to the antenna feed is integrated in the silicon die and symmetrically placed between the antenna feed points configured to stabilize the antenna resonant frequency with the RF rectifier's inherent capacity against varying surrounding materials and to generate a positive and negative DC output supply voltage against a bulk potential of the silicon die for directly operating a digital circuit in Fully Depleted Silicon On Insulator (FDSOI) technology embedded in the silicon die and wherein the resonant body is configured to work as a wavelength translator in between the antenna and free space.

2. The radio frequency frontend interface for a 61 GHz radio powered communication tag device according to claim 1, wherein the RF rectifier circuit is used for energy harvesting connected to the antenna, wherein the RF rectifier circuit is placed symmetric to the antenna to resonate with the antenna.

3. The radio frequency frontend interface for a 61 GHz radio powered communication tag device according to claim 2, wherein the RF rectifier circuit is complimented with a backscatter modulation transistor.

4. The radio frequency frontend interface for a 61 GHz radio powered communication tag device according to claim 2, wherein the RF frontend interface is used in RFID communication application or in near field communication application.

5. The radio frequency frontend interface for a 61 GHz radio powered communication tag device according to claim 1, wherein the RF rectifier circuit is complimented with a backscatter modulation transistor.

6. The radio frequency frontend interface for a 61 GHz radio powered communication tag device according to claim 5, wherein the silicon die (2) comprises the backscatter modulation transistor configured to communicate back to an interrogator, whereas a modulation gate of the backscatter modulation transistor is routed on a centerline of the slot of the antenna to be orthogonal to the electric field of the slot antenna and a charge pump circuit is configured to generate a required gate voltage for the backscatter modulation transistor from the supply voltage of the RF rectifier circuit, wherein a RFID data signal is used as a switching clock.

7. The radio frequency frontend interface for a 61 GHz radio powered communication tag device according to claim 5, wherein the RF frontend interface is used in RFID communication application or in near field communication application.

8. The radio frequency frontend interface for a 61 GHz radio powered communication tag device according to claim 1, wherein only a backscatter modulation transistor is connected to the antenna.

9. The radio frequency frontend interface for a 61 GHz radio powered communication tag device according to claim 1, wherein the antenna is designed as a single ended antenna and feed two rectifiers and multiplier circuits with single ended inputs generate the positive and negative DC output supply voltage.

10. The radio frequency frontend interface for a 61 GHz radio powered communication tag device according to claim 1, wherein the antenna is an unfolded rectangular slot antenna, wherein the RF rectifier circuit is arranged symmetrically along a longitudinal extend of the slot of the slot antenna.

11. The radio frequency frontend interface for a 61 GHz radio powered communication tag device according to claim 10, wherein the silicon die (2) comprises the backscatter modulation transistor configured to communicate back to an interrogator, whereas a modulation gate of the backscatter modulation transistor is routed on a centerline of the slot of the antenna to be orthogonal to the electric field of the slot antenna and a charge pump circuit is configured to generate a required gate voltage for the backscatter modulation transistor from the supply voltage of the RF rectifier circuit, wherein a RFID data signal is used as a switching clock.

12. The radio frequency frontend interface for a 61 GHz radio powered communication tag device according to claim 11, wherein the RF frontend interface is used in RFID communication application or in near field communication application.

13. The radio frequency frontend interface for a 61 GHz radio powered communication tag device according to claim 1, wherein the FDSOI digital circuit comprises a VNW and VPW connection and a well capacity which can be used as an additional energy storage capacitor.

14. The radio frequency frontend interface for a 61 GHz radio powered communication tag device according to claim 1, wherein the resonant body consist of a dielectric material with a dielectric constant of 5 or higher.

15. The radio frequency frontend interface for a 61 GHz radio powered communication tag device according to claim 14, wherein the material of the resonant body is ceramic or glass or high resistive silicon.

16. The radio frequency frontend interface for a 61 GHz radio powered communication tag device according to claim 1, wherein the resonant body has a cuboidal or a cylindrical or a spherical shape.

17. The radio frequency frontend interface for a 61 GHz radio powered communication tag device according to claim 1, wherein the RF frontend interface is used in RFID communication application or in near field communication application.

* * * * *